US012572885B1

(12) United States Patent
Balfaqih et al.

(10) Patent No.: US 12,572,885 B1
(45) Date of Patent: Mar. 10, 2026

(54) SYSTEM AND METHOD FOR SHIPMENT MONITORING AND TRACKING USING INTELLIGENT BOXES

(71) Applicant: UNIVERSITY OF JEDDAH, Jeddah (SA)

(72) Inventors: Mohammed Abobakr Balfaqih, Jeddah (SA); Saeed Ayman Alansari, Jeddah (SA); Naif Aref Alshaikh, Jeddah (SA); Yazeed Khalid Alasmari, Mecca (SA)

(73) Assignee: UNIVERSITY OF JEDDAH, Jeddah (SA)

( * ) Notice: Subject to any disclaimer, the term of this patent is extended or adjusted under 35 U.S.C. 154(b) by 0 days.

(21) Appl. No.: 19/187,398

(22) Filed: Apr. 23, 2025

(51) Int. Cl.
*G06Q 10/0833* (2023.01)
*B65D 79/02* (2006.01)

(52) U.S. Cl.
CPC ......... *G06Q 10/0833* (2013.01); *B65D 79/02* (2013.01)

(58) Field of Classification Search
CPC ......... G06Q 10/0833; G06Q 10/06393; G06Q 10/04; G06Q 10/0635; G06Q 50/06; G06Q 10/08; B65D 79/02; G08G 1/162; G08G 1/00; G08G 1/16; G08G 1/161; G08G 1/096791; G08G 1/0125; G08G 1/0137; G08G 1/163; G08G 1/166; G06K 7/10188; G06K 7/00; G06K 7/10; G06K 7/10009; G06K 7/10158; G06K 7/10178; H04W 4/35; H04W 4/80
See application file for complete search history.

(56) References Cited

U.S. PATENT DOCUMENTS

| | | | |
|---|---|---|---|
| 8,660,814 B2 | 2/2014 | Vock et al. | |
| 11,042,829 B2 | 6/2021 | Komoni | |
| 11,568,353 B2 | 1/2023 | Davis et al. | |
| 2006/0192673 A1* | 8/2006 | Irwin | G06Q 10/08 340/539.22 |
| 2016/0364678 A1* | 12/2016 | Cao | G06Q 10/083 |
| 2019/0322454 A1* | 10/2019 | Wan | B65G 1/1378 |

(Continued)

FOREIGN PATENT DOCUMENTS

CN          108981978 A        12/2018

OTHER PUBLICATIONS

Chang, W.-J., et al., "Design and Implementation of Intelligent Tape for Monitoring High-Price and Fragile Cargo Shipments During Transport Procedures," IEEE Sensors Journal, Dec. 1, 2020, vol. 20, No. 23, pp. 14521-14533, IEEE.

(Continued)

*Primary Examiner* — James J Yang
*Assistant Examiner* — Anthony D Afrifa-Kyei
(74) *Attorney, Agent, or Firm* — PATENT PORTFOLIO BUILDERS PLLC

(57) ABSTRACT

A shipment monitoring and tracking system includes an intelligent box and at least one logistic platform. The intelligent box has sensors, a processor using a machine learning algorithm for detecting a shipment integrity and a route violation based on an output from the sensors, and a wireless communication interface configured to send a notification about the shipment integrity and/or the route violation. The at least one logistic platform wirelessly is configured to wirelessly communicate with the iBox to receive the notification.

18 Claims, 12 Drawing Sheets

(56) References Cited

U.S. PATENT DOCUMENTS

| 2020/0051015 A1* | 2/2020 | Davis | G06Q 10/08 |
| 2022/0156680 A1* | 5/2022 | Tripathy | G06Q 10/047 |

OTHER PUBLICATIONS

Chuang, C.-H., et al., "Real-Time Monitoring via Patch-Type Piezo-electric Force Sensors for Internet of Things Based Logistics," IEEE Sensors Journal, Apr. 15, 2017, vol. 17, No. 8, pp. 2498-2506, IEEE.

\* cited by examiner

SYSTEM AND METHOD FOR SHIPMENT MONITORING AND TRACKING USING INTELLIGENT BOXES

BACKGROUND OF THE INVENTION

Technical Field

Embodiments of the subject matter disclosed herein generally relate to a system and method for shipment monitoring and tracking, and, more particularly, to an approach employing an intelligent packaging (iBox) having sensors and a wireless communication interface enabling detecting and reporting shipment damage and departure from the scheduled route using machine learning.

Discussion of the Background

The ongoing increase of online commerce (also known as electronic commerce, that is, the buying and selling of goods and services through the internet) caused increasing the volume and variety of shipments. Tracking the location and the conditions that the shipments are subjected to during transport is of an increased interest. For example, a package is moved from location to location through delivery services like FEDERAL EXPRESS. Occasionally, the package is damaged (e.g., opened or deformed) or lost, but it may be hard to determine where such an incident occurred, and, consequently, who is responsible for the damage.

Conventional package monitoring systems employ sensors (e.g., motion or pressure sensors) attached to or integrated in packages to detect and evaluate drop events. The sensors readings may be stored locally to be read at the package destination, reported and stored in an external data storage. In the former case, corrective actions cannot be enacted promptly. In the latter case, the irrelevant data transmission wastefully increases the wireless traffic and is also expensive. In some conventional systems, sensors' readings are stored or reported selectively when predefined conditions are met. For example, sensors' readings are stored or reported when drop events have been identified by determining altitude variations or using accelerator sensors to determine a drop distance.

The number and placement of the sensors on the packing material is an ongoing challenge. Conventionally, the sensors have been affixed as a label or as a package cover, regardless the specific content and size of the package. The conventional monitoring systems are unable to determine whether and when a package is opened.

Another shipment-related challenge is related to route tracking. Global Positioning System (GPS) sensors have been attached to packages. In addition to the above-mentioned sensor-related challenges (such as, increased volume of wireless traffic), the conventional systems are unable to distinguish between acceptable imprecisions and actual departures from planned routes.

Thus, there is a need for developing better shipment monitoring and tracking methods and systems, to overcome the limitations discussed above.

SUMMARY OF THE INVENTION

According to an embodiment, there is a shipment monitoring and tracking system including an intelligent box (iBox) and at least one logistic platform. The iBox includes sensors, a processor using a machine learning algorithm for detecting a shipment integrity and a route violation based on an output from the sensors, and a wireless communication interface configured to send a notification about the shipment integrity and/or the route violation. The at least one logistic platform is configured to wirelessly communicate with the iBox to receive the notification. The sensors may include transducers connected through wires to each other to form plural strings, which fully surround an interior of the iBox and yield voltage outputs depending on pressures applied to the transducers. The processor is configured to detect a breach of a wall of the iBox when the voltage output in one or more strings of the plural strings is less than a first threshold. The processor may also be configured to use a machine learning model to detect an overload event or a dropped event for the iBox, when the voltage output is higher than a second threshold. The at least one logistic platform may include a logistic industry platform, LIP, associated with a shipping point of the iBox, the LIP transmitting shipment information to the iBox, and a logistic customer platform, LCP, associated with a destination of the iBox, the LCP receiving and logging the notifications.

According to another embodiment, an iBox for shipment monitoring and tracking includes a data acquisition module, a processor, a wireless communication interface, and a power source. The data acquisition module is configured to gather data that enables assessing shipment integrity and location of the iBox. The processor uses a machine learning algorithm to detect the shipment integrity and/or the route violation based on the data. The wireless communication interface is configured to transmit one or more violation notifications to a logistic platform. The power source is configured to provide power to the data acquisition module, the processor, and the wireless communication interface.

According to yet another embodiment, there is a method for monitoring and tracking a shipment. The method includes placing a shipment content in an intelligent box, iBox, including a Global Positioning System, GPS, sensor and transducers having an electric resistance depending on pressures thereon, the transducers being connected with wires to each other to form plural strings, which are embedded in walls of the iBox to fully surround an interior of the iBox. The method further includes closing electric circuits formed by the plural strings through a set of pins located on a flap of the iBox and a set of holes located on a wall of the iBox, to provide power from a power source, the electric circuits then yielding a voltage output, using a machine learning algorithm at the iBox, to detect a shipment integrity and a route violation based on the measured voltage output, and sending a notification about the shipment integrity and/or a route violation to a remote server.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a shipping package tracking and/or monitoring system employing an intelligent box and associated methods.

According to some embodiments, the shipping system includes an intelligent box (iBox), a logistic industry platform (LIP), and a logistic customer platform (LCP). The iBox is a shipping container for packaging the goods to be shipped. The iBox includes flexible transducers (e.g., pressure sensors causing pressure-dependent electrical signals) for detecting shipment integrity violation, a GPS sensor, a data processing unit, and a wireless communication interface. The data processing unit, which includes at least one processor, hosts a violation event detector (VED) and a route violation detector (RVD). Note that in this document the term "processor" is used for the data processing unit. The iBox communicates, for example, in a wireless manner, with the LIP and the LCP. The LIP is located at or controlled by the package shipper. The LCP is located at or controlled by the package recipient (e.g., an intermediate or a final destination). The package shipper and the package recipient may pertain to the same courier company, and the LIP and LCP may be combined into a single platform monitoring packages in transit throughout their route. Such a platform would be connected to user interfaces at shipping point and destination to enable inputting shipping information and displaying transit information based on notifications received from the iBox, respectively.

FIGS. 1A to 5 illustrate various features of an iBox according to various embodiments. The iBox is made of paper-type material (e.g., cardboard), plastic, wood, etc. or a combination of layers of different materials.

Figures 1A, 1B:
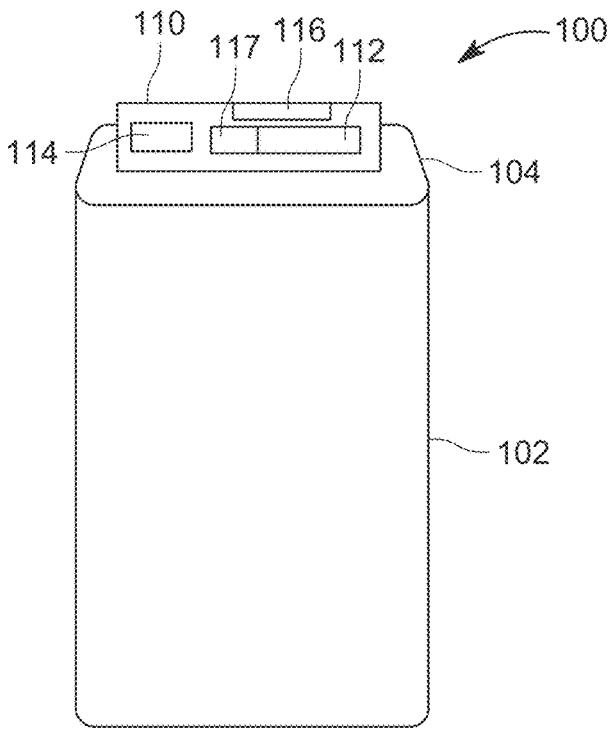
FIGS. 1A, 1B and 1C illustrate an envelope type iBox according to an embodiment.
Figure 1C:
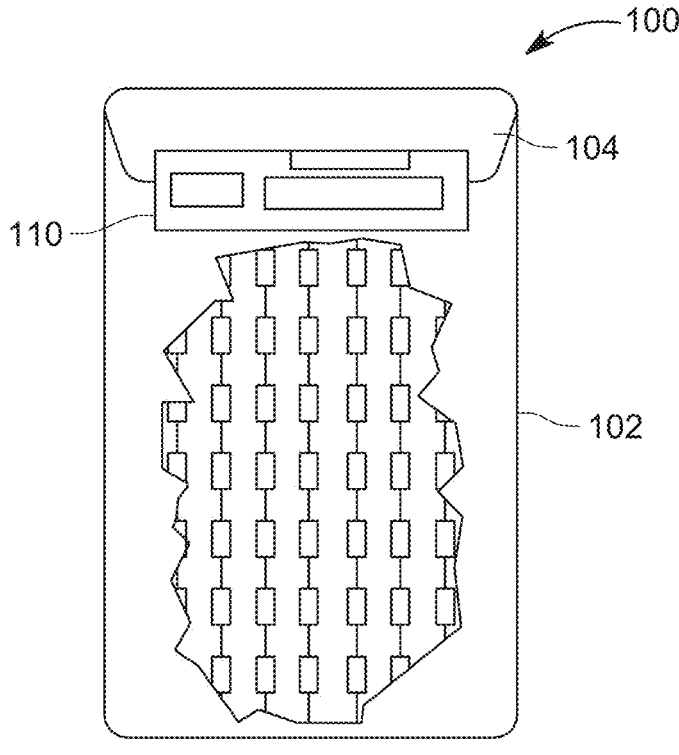

FIGS. 1A to 1C illustrate an envelope type iBox 100 (e.g., with 32 cm×24 cm area when the envelope is closed and a thickness of up to 0.6 cm). The iBox 100 has an envelope body 102, which is the main content area, and a flap 104. An electronic unit 110, visible in FIGS. 1A and 1C views, is affixed to an outer side of the flap 104. However, the electronic unit 110 may be attached to any other part of the iBox 100. The electronic unit 110 may be permanently attached to the iBox or may be temporarily attached for the duration of at least one iBox trip. The electronic unit 110 includes a power source 112 (e.g., a rechargeable or disposable battery, a piezoelectric device that generates power as the iBox moves, etc.), a processor 114, and a wireless communication interface 116 (for example, a 4G, 5G, Wifi, Bluetooth, transceiver). The location of the electronic unit is exemplary and not meant to be limiting. That is, in other embodiments, the electronic unit may be mounted at another location outside or inside the iBox.

FIG. 1B illustrates the same iBox 100 as in FIG. 1A in a view showing the inner part of the flap 104 with a closing and connecting (CC) mechanism made of a band of pin heads 106 attached to the flap 104 and a band of hole connectors 108 distributed on the envelope body 102. The bands may be rigid, flexible, or one rigid and one flexible. The bands may have an adhesive (e.g., glue) on their surface to favor connection stability yet not to affect the electrical connections between respective pin heads and hole connectors. When the flap 104 is closed, the bands 106 and 108 overlap, sealing the envelope content and closing electric circuits of flexible transducers 120$a$, 120$b$, . . . , 120$n$ via pairs of a pin head and a hole connector. The flexible transducers may be embedded into the walls of the iBox body and flap or placed inside the iBox to surround the shipped content.

In FIGS. 1B, 1C, 2, 3, and 4, illustrative openings are created by virtually removing outer layers of iBox's walls to show strings 1181 of series-connected transducers 120 and the wires 122 in-between. There may be plural strings located on the iBox 100, so that I is between 10 and 1000 in one embodiment. In another embodiment, I is between 100 and 200. Other values for I may be selected. Each string is connected to the electronic unit 110 and forms a closed circuit. In one embodiment, the strings of transducers fully surround the shipped content, i.e., the strings of transducers are distributed in each wall/flap/part of the iBox such that if any part of the iBox is cut open or broken into, at least a string 1221 is damaged, so that the corresponding closed electrical circuit becomes open. In this regard, note that the plural strings show in FIG. 1B are connected to the electronic unit 110 so that the electronic unit can determine when a string becomes an open electrical circuit. The electronic unit also is configured (with processing capabilities) to determine when a voltage in the string changes, for example, due to a pressure applied on the outside of the iBox.

A non-zero voltage output occurs across each string of transducers when the electric circuits therethrough are closed. The electronic unit's components (i.e., the processor, the wireless communication interface and possibly a GPS sensor) are typically rigid circuits, while the transducers and the wires in-between are typically flexible.

FIG. 1C illustrates the iBox 100 shown in FIGS. 1A and 1B when the flap 104 is closed. In this case, the electronic unit 110 provides power and collects information (i.e., voltage output) from the transducers 120$a$-$n$. For example, the piezoelectric sensors have a resistance depending on the pressure they experience and thus, by measuring the resistance of the strings, the electronic unit is capable of estimating the pressure applied to the strings. The electronic unit 110 may also house a GPS sensor 117 (see FIG. 1A), or the GPS sensor may be otherwise attached to or mounted on to the iBox 100. The GPS sensor 117 provides location information to the processor 114.

Figure 2:
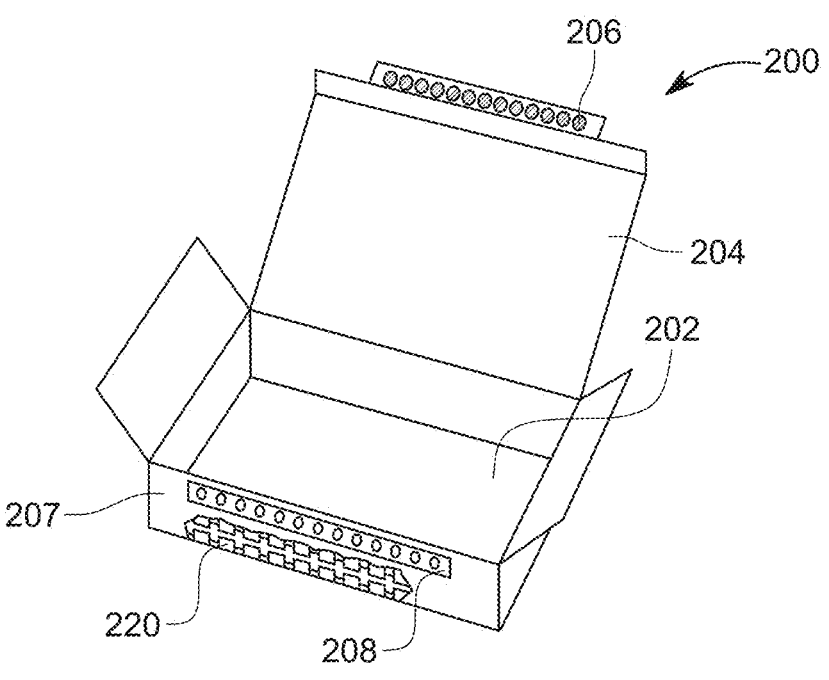
FIG. 2 illustrates a small box type iBox according to an embodiment.

FIG. 2 illustrates an iBox 200, which is a small box (e.g., 20 cm×15 cm×5 cm for length×width×thickness, but any other values may be used). Here, a band of pin heads 206 is attached to the flap 204 and a band of hole connectors 208 is placed on a side 207 of the iBox body 202. Transducers 220 are embedded in the iBox's body 202 and cover 204. When the box is closed, the bands 206 and 208 overlap closing the electric circuits of the corresponding strings, as discussed above relative to FIGS. 1A-C.

Figure 3:
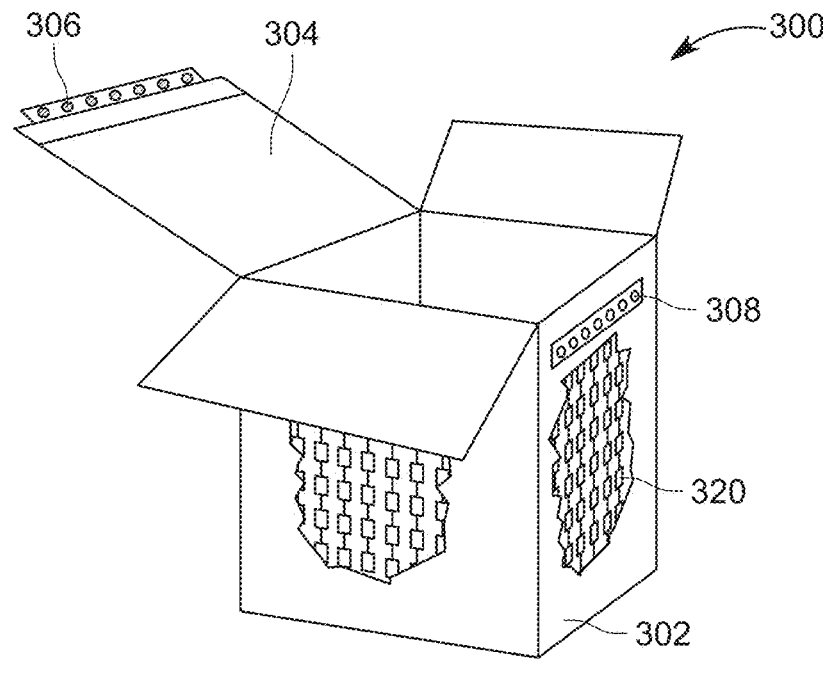
FIG. 3 illustrates a large iBox according to an embodiment.
Figure 4:
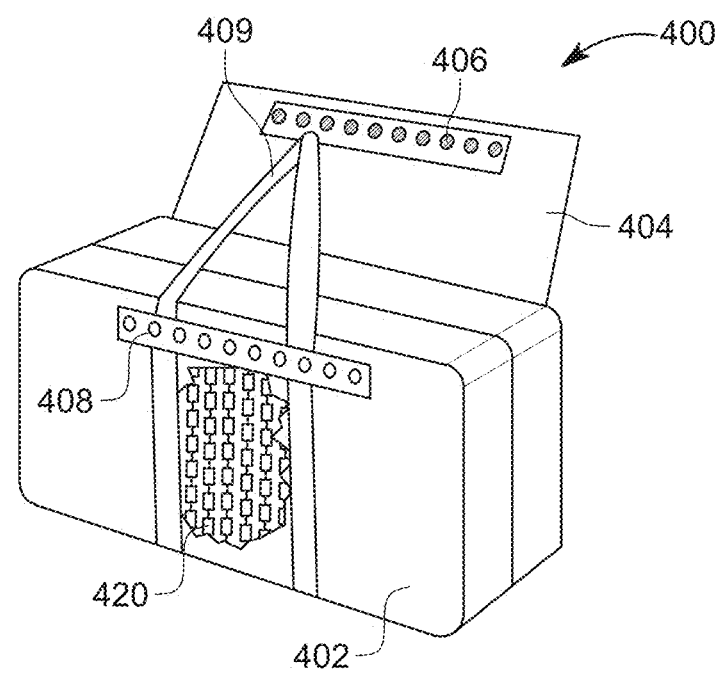
FIG. 4 illustrates an iBox with handles according to another embodiment.

FIG. 3 illustrates an iBox 300 larger than iBox 200 (e.g., 40 cm×30 cm×10 cm, or other dimensions; note that in one embodiment, these dimensions may be in the meter range), but similarly having a body 302, a cover 304, a band of pin heads 306 attached to the cover 304, and a band of hole connectors 308 on a side of the body 302. FIG. 4 illustrates yet another iBox 400 having a different shape than iBox 300 and also including handles (one shown) 409. Similar to iBoxes 100, 200, and 300, the iBox 400 has a body 402, a cover 404, a band of pin heads 406 and a band of hole connectors 408 overlapping the band 406 when the iBox 400 is closed so that the power source provides power to the electric circuits of the strings of transducers, and the processor can gather information (voltage output) about each string, and also can determine the iBox's location, etc.

Figure 5:
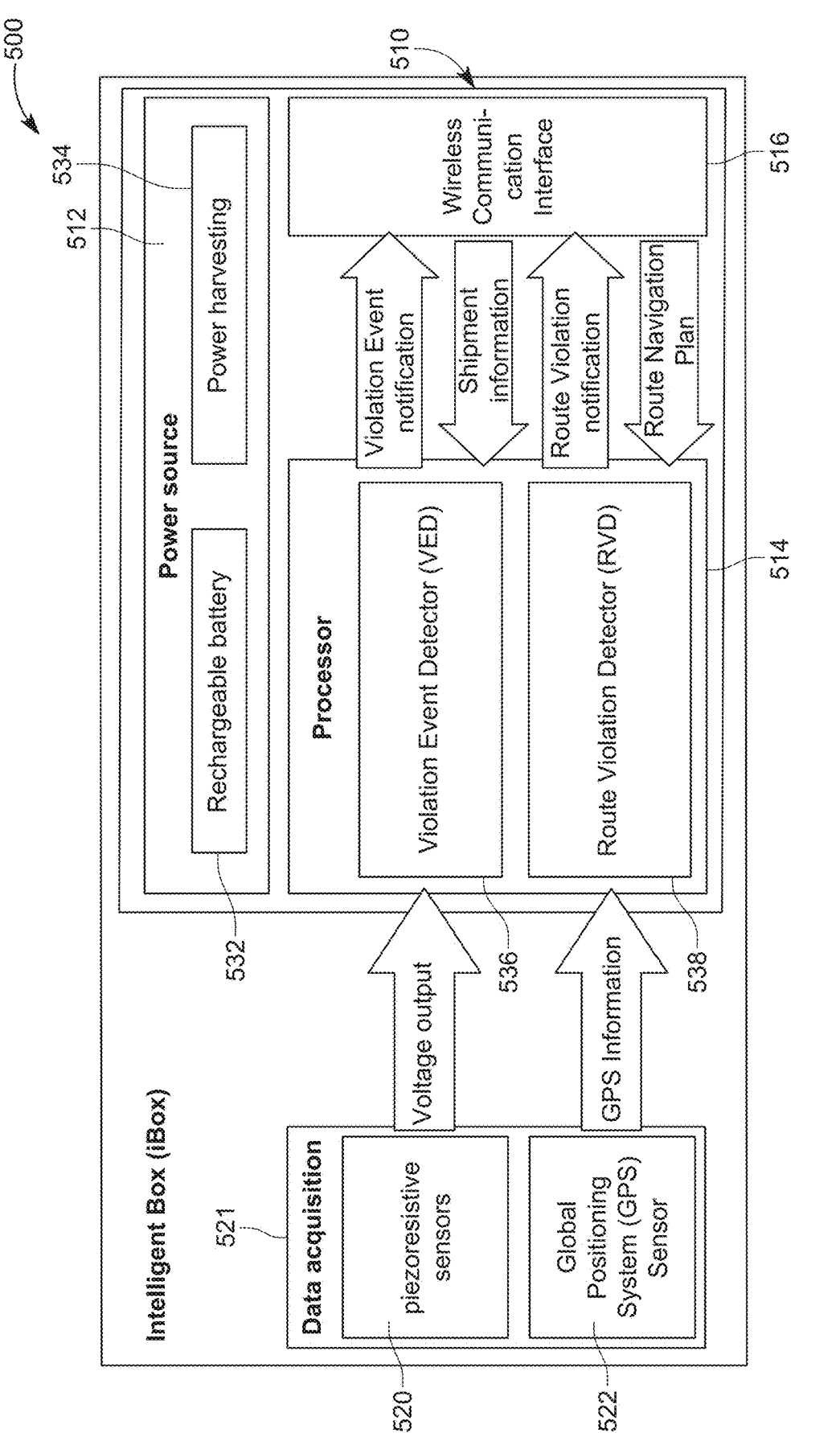
FIG. 5 is a block diagram of electronic components of an iBox illustrating their connections and functions according to an embodiment.

FIG. 5 is a block diagram of an iBox 500 (which may have dimensions and shape as any of the iBoxes 100, 200, 300, and 400 or other dimensions and shapes) for explaining its operation. The iBox 500 includes the electronic unit 510 (corresponding, for example, to 110 in FIG. 1A), which has a power source 512 (corresponding, for example, to the power source 112 in FIG. 1A), a processor 514 (corresponding, for example, to the processor 114 in FIG. 1A), and a communication interface 516 (corresponding, for example, to the wireless communication interface 116 in FIG. 1A). The transducers 520 (which may be the piezoresistive sensors 120) and the GPS sensor 521 (which may be GPS sensor 117 in FIG. 1A) may be functionally grouped into a data acquisition module that provides information to the processor 514. However, note that, in terms of location, the transducers are embedded into the iBox's walls or inside the iBox to completely surround the goods to be shipped. The GPS sensor 521 may be part of the electronic unit or separately located on the iBox.

The transducers 520 provide a voltage output to the processor. The transducers 520 provide information on the mechanical force (stress or strain) at their location, applied, for example, by an external force. For example, a piezoresistive sensor detects changes in mechanical stress or strain by measuring the corresponding change in electrical resistance within a material (according to the "piezoresistive effect" where the resistance of a material alters when the material is squeezed or stretched). The piezoresistive sensor converts physical pressure into an electrical signal because the change in electrical resistance causes a change of the voltage across the transducer yielding a signal when everything else (e.g., supplied power, sensor's inter-connections) remains the same.

While normal pressure (e.g., atmospheric pressure) is exerted on the transducers and the electric circuit therethrough is closed, the voltage output has a first value (or rather a small range around the first value). When the electric circuit is interrupted the voltage output falls significantly to a second value (e.g., zero) below the first value. The strings of transducers may be connected in series or in parallel or a combination thereof. However, if an external force is applied on the iBox, without damaging the integrity of its walls, the transducers experience an increase strain or stress, resulting in an increasing resistance, which results in a change in the measured voltage at the processor 514, for the strings that experience the external force.

The GPS sensor 522 receives signals from satellites in the GPS network, enabling it to determine the precise location (latitude, longitude, and altitude) of the iBox 500. When multiple GPS readings are combined, the iBox's average velocity may also be assessed. Thus, the GPS sensor is a satellite receiver with an antenna that enables iBox's location tracking.

The power source 512 includes a rechargeable battery 532 that feeds the electrical circuit(s) associated with each string 1181, the processor 514 and the wireless communication interface 516, to ensure their ability to operate throughout a projected duration of the iBox's trip, from the origin to its destination. For example, the rechargeable battery 532 may be a small (e.g., about 1 mm thickness and 10 mm diameter) lithium-based battery that may be recharged wirelessly. The power source may also include a power harvesting device 534 able to capture and convert small amounts of readily available energy in the environment (such as kinetic energy or thermal energy) into usable electrical energy, which may be then stored by the battery 532.

The processor 514 includes hardware (one or more processors, at least one memory, etc.) and software (executable codes) that supports a violation event detector (VED) module 536 and a route violation detector (RVD) module 538. These modules may be implemented in software, for example, in the processor 514, as separate hardware modules, or as a combination of both.

The VED module 536 is configured to receive (i) shipment information (such as a shipment identifier (ID), type of the iBox, weight of the iBox and its content, dimensions of the iBox, iBox wall material, etc.) and any other useful information for violation detection from the LIP, via the wireless communication interface 516, and (ii) voltage output from the transducers 520 and associated strings 1181. When the voltage output from the strings is below a first threshold th1, the VED module detects that the iBox is opened, cut, or teared. When plural transducers experience additional pressure for an extended period, the average voltage output increases above a second threshold th2 and the VED module detects that the iBox is improperly handled, subjected to a pressure above an allowable level, which likely causes damage to the content of the box.

In one embodiment, the VED module 536 employs a decision algorithm that could be built using different machine learning models (e.g., support vector machines, decision trees, k-nearest neighbor, and random forest). Based on the voltage output from the strings 1181 and the shipment information received from the LIP, the decision algorithm may yield a violation type (i.e., dropped, overloaded, or open), which may be further nuanced with a severity level (low, medium, or high). The VED module 536 then outputs a violation event notification (VEN) and controls the wireless communication interface 516 to send the VEN to the LCP. Note that all the calculations and decisions conducive to determining the type of violation, its severity level, and the generation of the violation event notification takes place in the electronic unit 510, and not in a server remote from the iBox. Thus, the iBox does not have to exchange large amounts of data with such a remote server, only the VEN notification.

The RVD module 538 is configured to receive (i) a navigation plan for the iBox, from the LIP, via the wireless communication interface 516, and (ii) GPS information from the GPS sensor 522. Based on these inputs, the RVD module 538 selectively generates (at the iBox location) a route violation notification (RVN) and controls the wireless communication interface 516 to send the RVN to the LCP. The RVD module 538 may compare a specific number n of successive GPS sensor readings $P_i$ with the navigation plan.

The number n may be specified by the LIP when providing shipment information. In order to conserve battery power, alternatively or additionally, the RVD module may vary the number n in view of factors such as travel speed, distance, battery condition, etc. In one embodiment, the GPS sensor readings are sent to the RVD module at predefined time intervals. The RVD module performs the process of comparing successive GPS sensor readings P with the navigation plan after receiving at least n readings. In some embodiments, the shipment will be considered on track (i.e., no route violation) if a certain percentage p of the readings (e.g., p=75%) are within a predetermined distance D (e.g., 5 m) from the planned traveling route. Note that the value of p may be changed to any value between 55 and 95%. The value of distance D may be adjusted by the owner of the iBox or the owner of the cargo in the iBox to a desired value, for example, between 5 and 500 m. The number n of reading may be selected to be 3, or 5, or 7 or other values. The number n of readings ensures that even if the iBox deviates (actually or due to a misreading of the data) from the expected path for m readings, where m is smaller than n, but for the rest of the readings the iBox is within the predetermine distance D, no alarm or warning message is generated. In other words, the number n ensures that a fluke in the readings does not generate the alarm or warning message.

Figure 6:
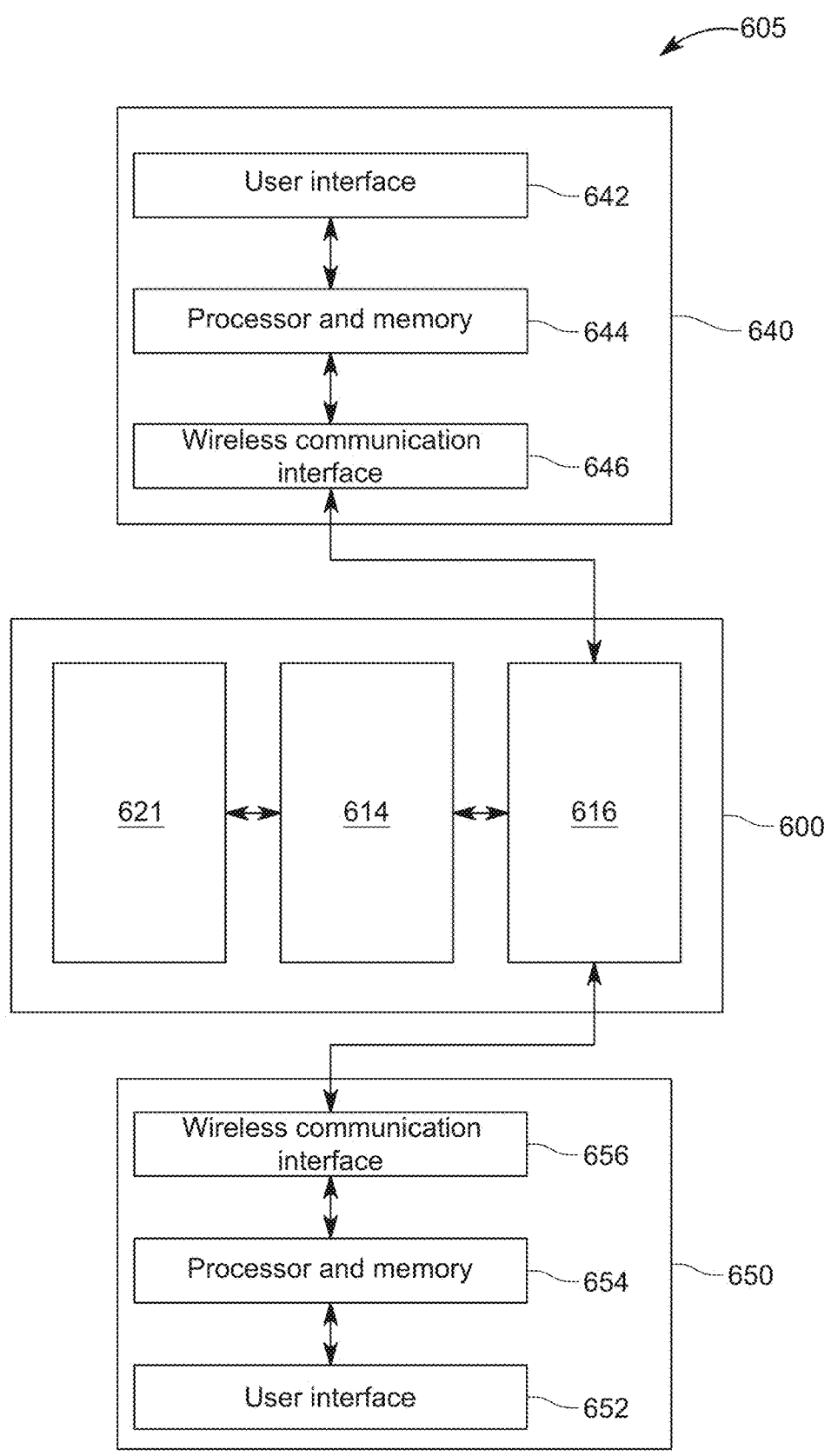
FIG. 6 is a block diagram of a shipment monitoring and tracking system according to an embodiment.

FIG. 6 is a block diagram of a shipment monitoring and tracking system 605 according to an embodiment. The system 605 includes an iBox 600 (which can be any of the previously discussed iBoxes), an LIP 640, and an LCP 650. The iBox 600 includes a data acquisition module 621, a processor 614, and a wireless communication interface 616, which are substantially similar to the data acquisition module 521, the processor 514, and the wireless communication interface 516, respectively. The phrase "substantially similar" indicates that the respective components are functionally equivalent although not necessarily identical. The wireless communication interfaces 646 and 656, and the processors 644 and 654 (with associated memories) of the LIP 640 and the LCP 650, respectively, are a technical necessity for these platforms to communicate wirelessly with the iBox 600. The wireless communication interfaces 642 and 656 may use any known radio communication technology (e.g., cellular, WiFi, Bluetooth, LoRa, Zigbee, etc.). The user interfaces 642 and 652 enable users to input and/or visualize shipment-related information. The wireless communication interfaces 642 and 656 of the LIP 640 and the LCP 650, respectively, may use any radio communication technology that enables transmitting and receiving shipping-related data to and from the iBox 600. The first radio communication technology used between the LIP 640 and the iBox 600 may be different from the second radio communication technology used between the iBox 600 and the LCP 650. For example, the first technology may be Bluetooth or Zigbee, which are more suitable for short distance, while the second technology may be cellular or WiFi.

Before the iBox 600 is shipped, the iBox's processor 614 receives from the LIP 640, via the wireless communication interfaces 640 and 616, shipment information and a route navigation plan for the iBox's transport, from the origin to the destination. The iBox's VED and RVD modules may run in parallel, the VED module receiving the shipment information and the RCV module receiving the route navigation plan. When the VED module or the RVD module detect a shipment integrity violation or an impermissible departure from the planned route (inferred from the route navigation plan), respectively, the VED module or the RVD module output a notification, which is sent to the LCP via wireless communication interfaces 616 and 656 respectively. The LIP 640 may also transmit at least part of the shipment information and the route navigation plan to the LCP 650 directly or via the iBox 600.

Figure 7:
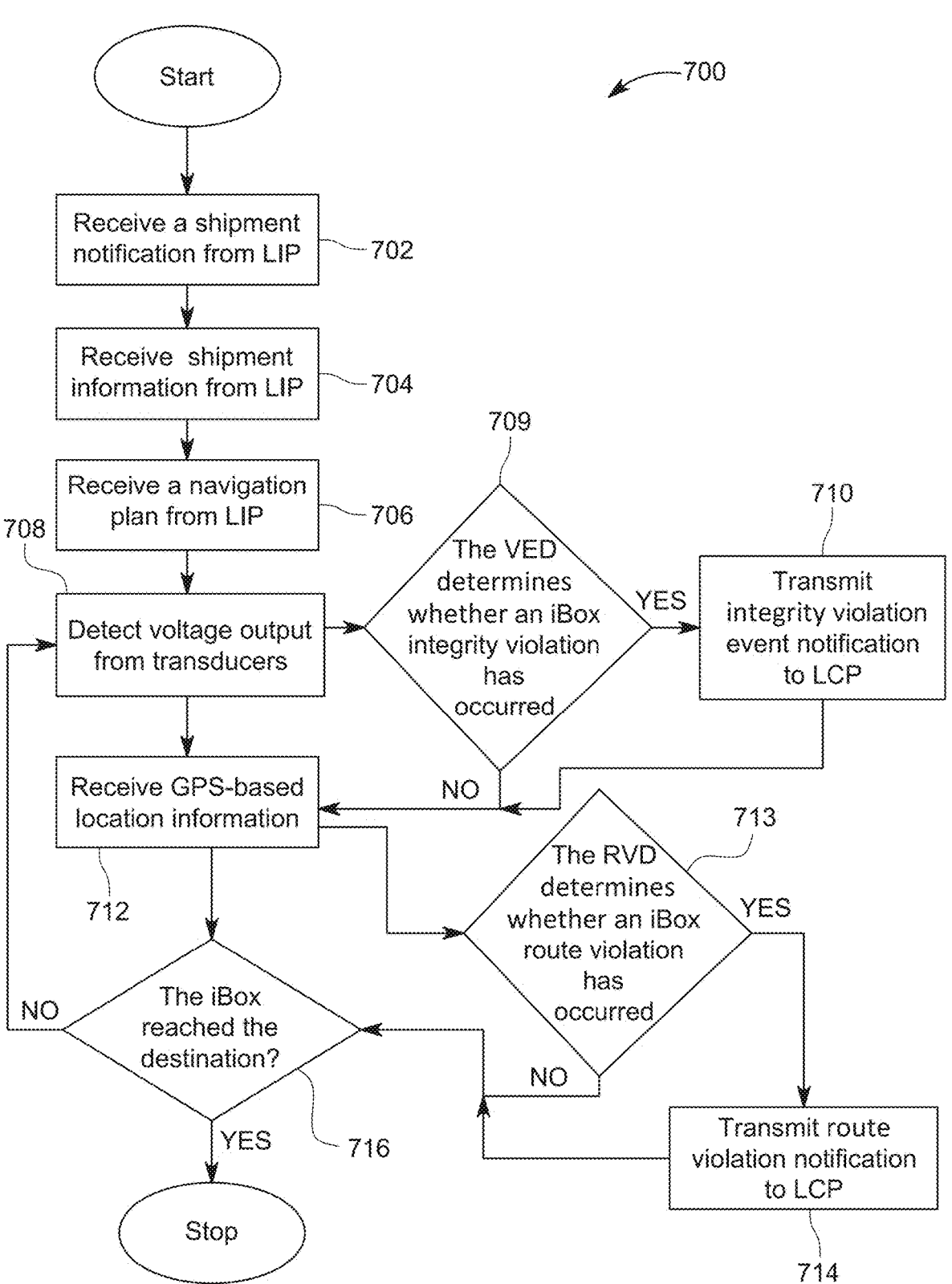
FIG. 7 is a flowchart of a method performed by a processor of an iBox according to an embodiment.

FIG. 7 is a flowchart of a method 700 performed by a processor (e.g., 116, 516, or 616) of an iBox (such as any of the iBox 100, 200, 300, 400, 500, or 600). The processor first receives 702 a shipment notification from the LIP, via the wireless communication interface (e.g., 116, 516, or 616). The shipment notification includes a shipment ID. The processor then receives 704 the shipment information and also receives 706 the navigation plan from the LIP. In one embodiment, the order of the steps 704 and 706 is reversed (i.e., the iBox receives the navigation plan before receiving the shipment information). In another embodiment, the steps 704 and 706 are merged into a single message/step. The shipment information and the navigation plan may be labeled using the shipment ID. The shipment information may also include parameters relevant to the VED module and/or the RVD module, such as voltage thresholds, number of successive locations used for detecting route violations, percentage of the successive locations that should be within a predetermined distance from the navigation plan, the predetermined distance, etc. Steps 702, 704, and 706 may be collectively considered an initiation phase of the shipment tracking and monitoring.

Detection of the voltage output from the transducers occurs at 708. Such detection may be based on periodic readings or hardwired (circuitry, filters) to indicate voltage changes. The transfer of information from the GPS sensor to the processor (i.e., the processor receives 712 GPS-based location readings) typically occurs periodically but the time interval between readings may be varied (e.g., depending on speed) or paused for a predetermined time interval (e.g., while the iBox is aboard a plane). Steps 708 and 712 represent a data acquisition phase and are performed until the iBox reaches its destination. Whether the iBox has reached the destination, may be tested 716 periodically, after receiving the GPS-based location information. In one embodiment, the processor determines that the iBox has reached the destination by comparing a current iBox location with the navigation plan. The processor may then send an arrival notification to the LCP before stopping. In another embodiment, the LCP sends an arrival notification to the processor, and the processor verifies at 716 whether such notice has been received. It should be understood that although in FIG. 7, step 716 follows steps 708 and 712, the processor may instead perform steps 708 and 712 while the iBox has not reached the destination.

Based on detected the voltage output detected in step 708, the VED module, hosted by the processor, determines 709 whether an iBox integrity violation has occurred. If the VED module decides that indeed an iBox integrity violation has occurred (i.e., "YES" branch of 709), the processor controls the wireless communication interface to transmit 710 an integrity violation event notification to the LCP. One embodiment of the VED module's operation is later discussed based on FIG. 8. The notification may include various information about the violation event, for example, the type and level thereof. When the VED module decides that no iBox integrity violation has occurred (i.e., "NO" branch of 709) or after step 710, the method continues with step 712.

At step 712 the processor receives 712 the GPS-based location information. Based on this location information, the RVD module hosted by the processor determines 713 whether a route violation has occurred. If the RVD module indeed decides that indeed a route violation has occurred (i.e., "YES" branch of 713), the processor controls the wireless communication interface to transmit 714 a route violation notification to the LCP. This notification may also include additional information related to the violation, such as the current iBox location, the evolution of the offsets of the iBox relative to the planned path, etc. When the RVD module decides that no route violation has occurred (i.e., "NO" branch of 713) or after step 714, the method continues with step 716.

When the processor determines that the iBox has reached the destination (i.e., "YES" branch of 716), it stops running the shipment tracking and monitoring application in the iBox (e.g., the VED module and the RVD module, data acquisition process, etc.). As long as the iBox has not reached the destination (i.e., "NO" branch of 716), the processor repeats at least steps 708, 709, optionally 710, 712, 713, optionally 714, and 716.

Figure 8:
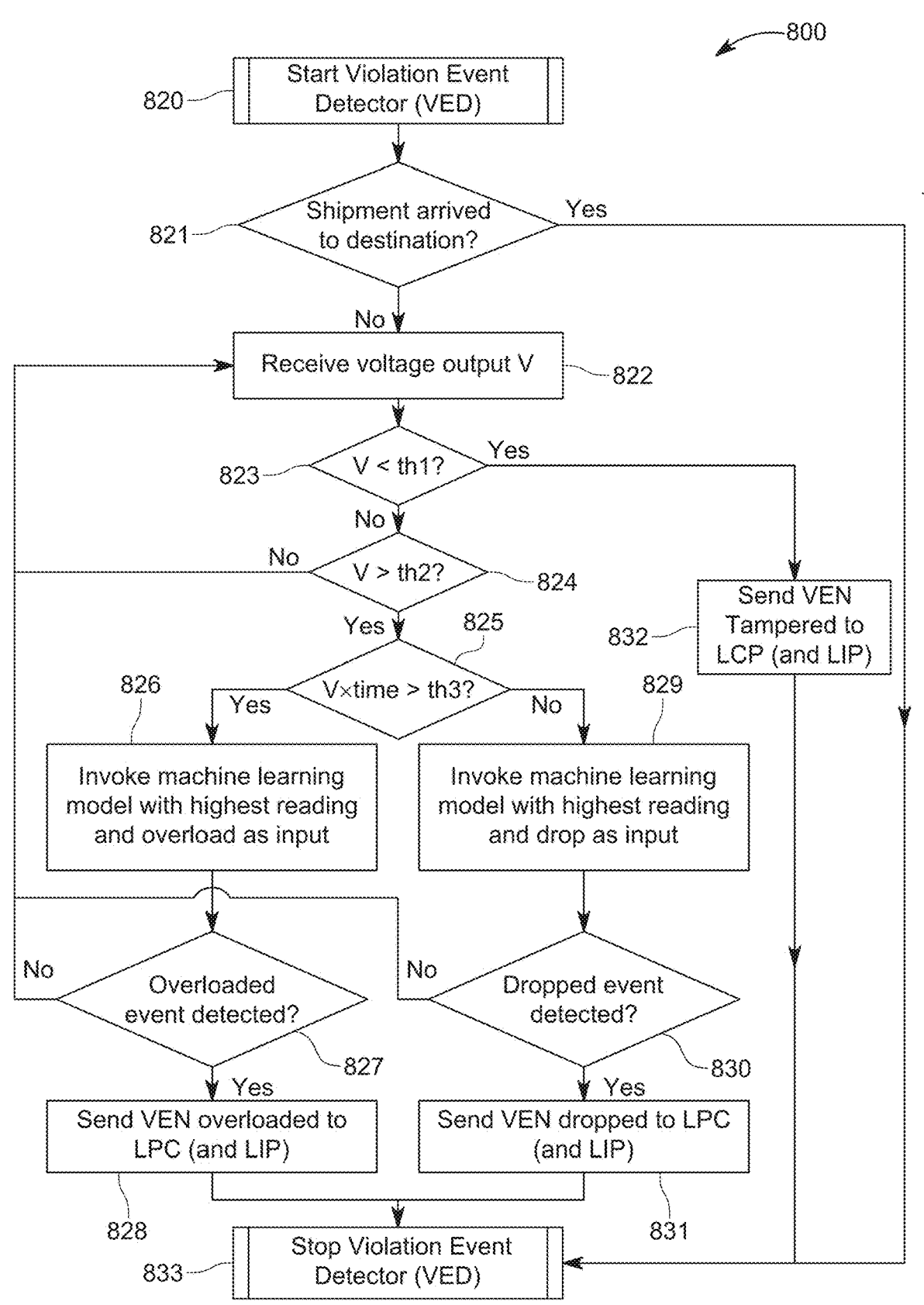
FIG. 8 is flowchart of a method performed by a violation event detector hosted by a processor of an iBox according to an embodiment.

FIG. 8 is a flowchart of a method 800 performed by the VED module hosted by the processor of an iBox according to an embodiment. During the initiation phase, the VED module is started at 820. The VED module then tests 821 whether the iBox has arrived at the destination. While the iBox did not arrive at the destination (i.e., the "No" branch of 821), the VED module performs the following steps. The VED module receives 822 the output voltage V of the strings of transducers (e.g., piezoresistive sensors). As mentioned above, the hardware may be configured to measure the output voltage at predetermined time intervals or when a significant change (i.e., a variation larger than a predetermined measurement stability fluctuation) occurs.

The VED module then compares 823 the output voltage V with a first threshold th1. This first threshold th1 is close to a normal voltage obtained when the electric circuits are closed and all transducers are connected and operational sensing no additional pressure or no open circuit. However, in order to avoid frequent spurious notifications, the first threshold th1 is preferably slightly smaller than the normal voltage with a difference larger than an estimated measurement accuracy. When the output voltage V is smaller than the first threshold th1 (i.e., the "Yes" branch of 823), the VED module sends 832 to the LPC a violation event notification indicating that the iBox has been tampered with (i.e., the iBox is opened, unsealed, torn or at least one of the transducers is broken) and, optionally, also to the LIP.

When the output voltage V is not smaller than the first threshold th1 (i.e., the "No" branch of 823), the VED module compares 824 the output voltage V with a second threshold th2 to detect whether the iBox has been subjected to significant additional pressure. The second threshold th2 is larger than the normal voltage (and thus larger also than th1) and may be selected to correspond to an additional pressure that may damage the iBox. When the output voltage V is not larger than the second threshold th2 (i.e., the "No" branch of 824), the VED module takes no further action until receiving 822 another voltage output while the iBox has not yet arrived at the destination (i.e., after the "No" branch of 821).

After determining that the output voltage V is larger than the second threshold th2 (i.e., the "Yes" branch of 824), the VED module determines whether the output voltage V being larger than th2 lasts longer than a predetermined time. In one embodiment, the VED module compares 825 the product of the output voltage and time interval corresponding to the higher voltage readings with a third threshold th3 to determine whether an overload or a drop event has occurred. A product of the output voltage and time larger than the third threshold th3 (i.e., the "Yes" branch of 825) indicates a possible overload event (also that the output voltage V being larger than th2 lasted longer than a predetermined time). The VED module then feeds 826 a machine learning model, stored in the processor of the iBox, with the highest voltage reading and potential overload as input to determine 827 whether an overloaded event has occurred. When the overloaded event is detected (i.e., the "Yes" branch of 826), the VED module sends 828 to the LCP a VEN indicating an overloaded iBox and, optionally, also to the LIP.

When the product of the output voltage and time is not larger than the third threshold th3 (i.e., the "No" branch of 825), it indicates a possible drop event (also that the output voltage V being larger than th2 lasted less than the predetermined time). The VED module then feeds 829 another (or the same) machine learning model with the highest voltage reading and potential drop as input to determine 830 whether a dropped event has occurred. When the dropped event is detected (i.e., the "Yes" branch of 830), the VED module sends 831 to the LCP a VEN indicating a dropped iBox and, optionally, also to the LIP.

After sending the VEN at 828 or 831, or when the VED module determines that no overload or dropped event has occured (i.e., the "No" branches of 827 and 830), steps 822 to 832 are repeated until the VED module determines that the iBox has arrived at the destination (i.e., the "Yes" branch of 821), and the VED module stops 833.

Figure 9:
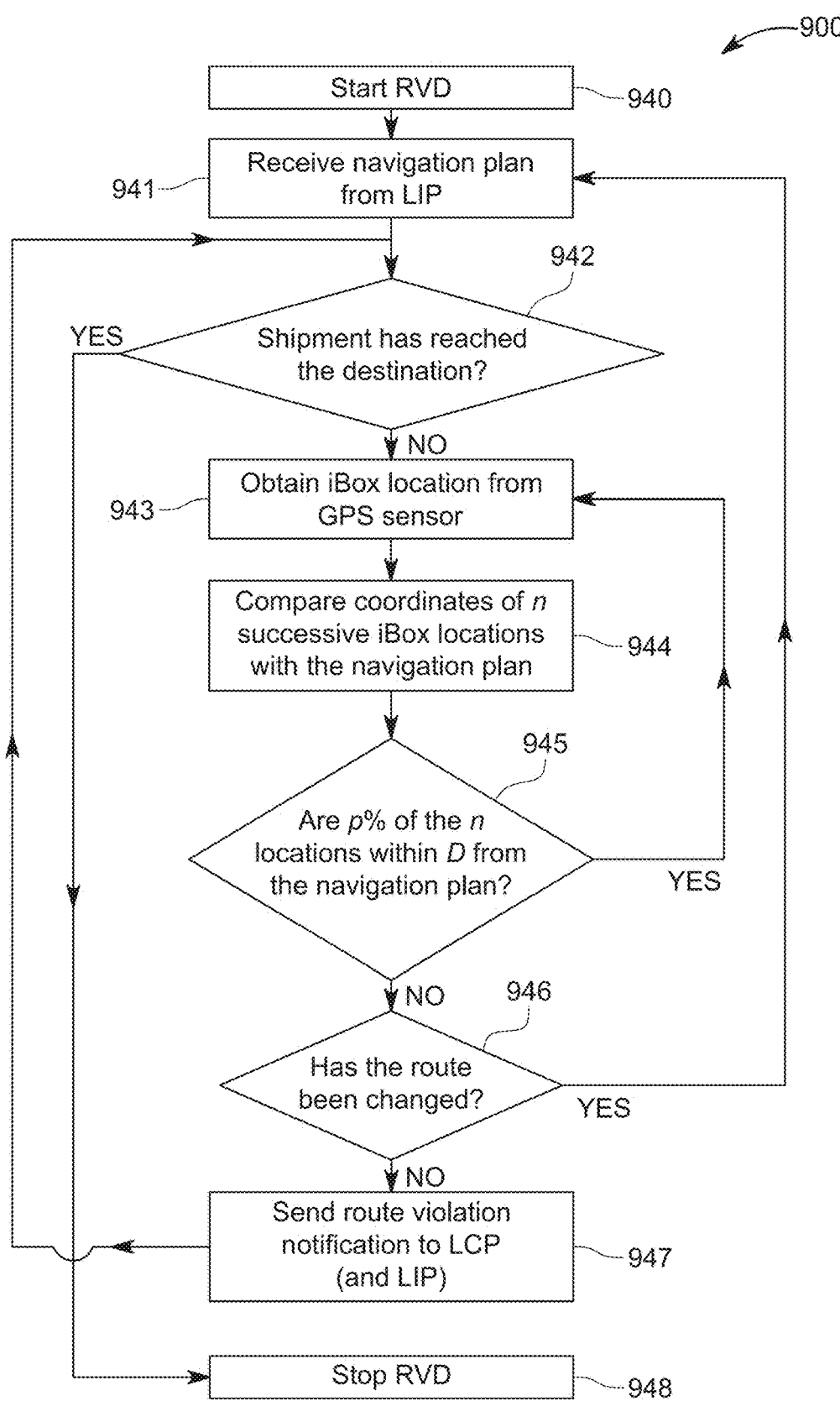
FIG. 9 is flowchart of a method performed by a route violation detector hosted by a processor of an iBox according to an embodiment.

FIG. 9 is flowchart of a method 900 performed by the RVD module hosted by the processor of an iBox to detect whether the iBox's route follows the navigation plan according to an embodiment. The method 900 may be performed in parallel with the method 800. After the RVD module is started 940, the RVD module receives 941 the navigation plan from the LIP. The RVD module then tests 942 whether the iBox has reached the destination, and when the iBox has indeed arrived at the destination (i.e., the "Yes" branch of 942), the RVD module stops 948.

While the iBox has not reached the destination (i.e., the "No" branch of 942), the RVD module performs the following steps. The RVD module obtains 943 a current iBox location from the GPS sensor and compares 944 the coordinates of n successive locations (e.g., n is 5) of the iBox with its navigation plan. For example, the RVD module calculates distances di with i from 1 to n for n successive measured locations $P_i$ of the iBox to the closest point of the navigation plan, and compares these distances di with a predetermined distance D. The RVD module then determines 945 whether p % (e.g., 75%) of the n locations are within D from the navigation plan. The values of n, D, and p are parameters that may be predefined or configured by the LIP. Also, values associated with these parameters have been discussed above. When p % of the n locations are within D from the navigation plan (i.e., the "Yes" branch of 945), the RVD modules determines that the iBox is following its navigation plan and the steps 943 to 945 are repeated. Note that in this embodiment, all these calculations and estimation are performed within the electronic unit of the iBox.

When p % of the n locations are not within D from the navigation plan (i.e., the "No" branch of 945), the RVD module verifies 946 whether the route has been changed. Another running process may have received (e.g., from the LIP) and stored as a new route. The RVD module compares the navigation route received at 941 with the stored route to determine whether the route has been updated. If the RVD module determines that the route has indeed been changed (i.e., the "Yes" branch of 946), the RVD module returns to step 941, otherwise (i.e., the "No" branch of 946), the RVD module sends 947 a route violation notification to the LCP and, optionally, also to the LIP. The RVD module then repeats steps 942 to 947.

Figure 10:
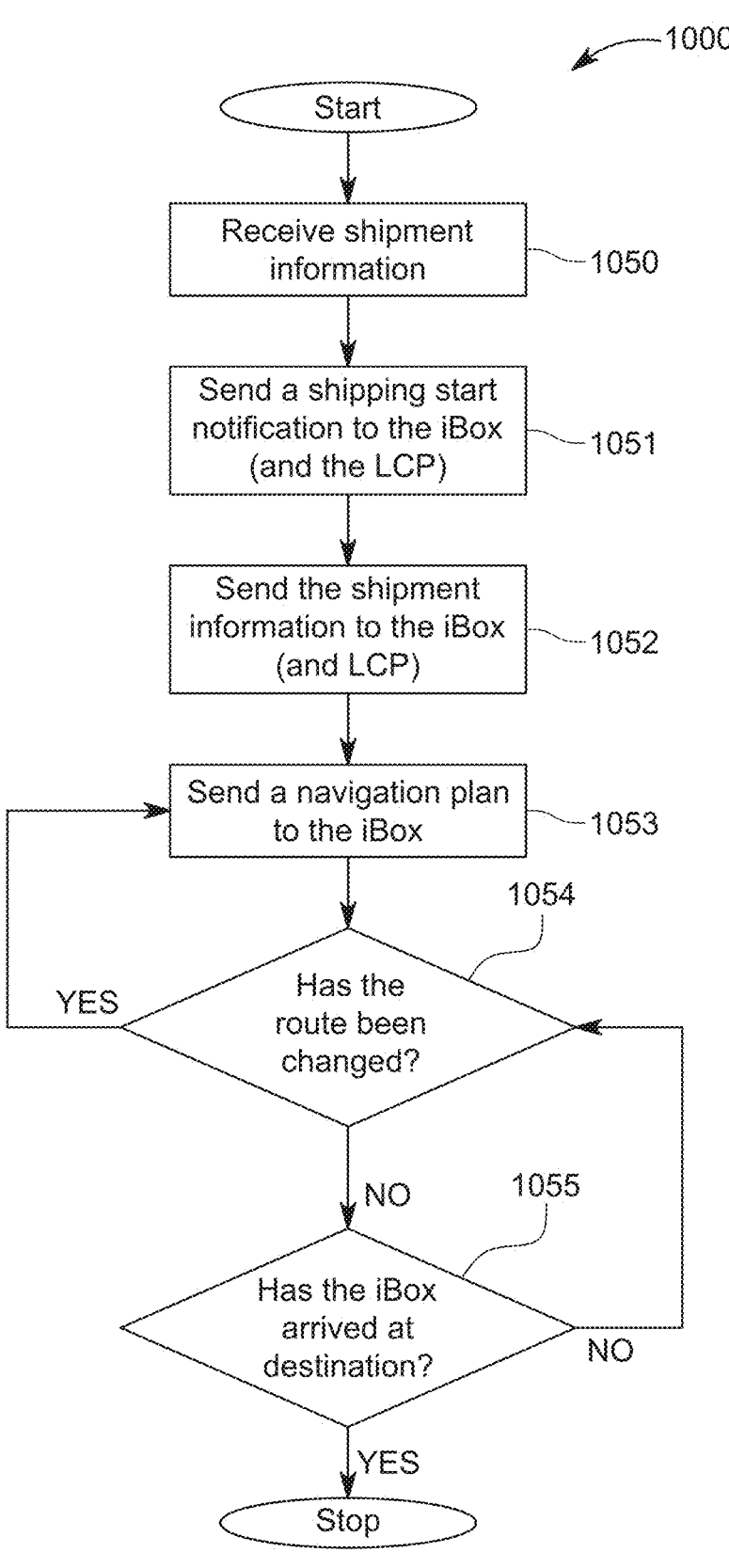
FIG. 10 is a flowchart of a method performed by a logistic industry platform according to an embodiment.

FIG. 10 is a flowchart of a method 1000 performed by an LIP (e.g., 640 in FIG. 6) according to an embodiment. First, the LIP receives 1050 shipment information related to the iBox to be monitored and tracked. The shipment information includes at least an iBox ID, and destination, but it may include various other information related to the iBox, shipment content, iBox walls material, required handling constraints, etc. This information may be input to the LIP processor (e.g., 644 in FIG. 6) via a user interface (e.g., 642 in FIG. 6) and/or received from another device via the LIP wireless communication interface (e.g., 646 in FIG. 6). The LIP then sends 1051 a shipping start notification to the iBox. The LIP then sends 1052 the shipment information to the iBox and, optionally, also to the LCP. Further the LIP sends 1053 the navigation plan to the iBox. The steps 1051, 1052, and 1053 correspond to the steps 702, 704, and 706 (i.e., the iBox receiving the shipping start notification, the shipment information, and the navigation plan, respectively) and, therefore, details already discussed with regard to these steps are not repeated. The steps 1051, 1052, and 1053 may also include (i.e., optionally) sending the shipping start notification, the shipment information, and the navigation plan, respectively, to the LCP. The steps 1051, 1052, and 1053 may be paired and combined.

The LIP then determines 1054 whether the route of the iBox has been changed. The route may be changed by the LCP or a controller of the shipping company. In some embodiments, the LIP itself may change (adjust, update) the navigation plan triggered by iBox's actual trajectory departing from the navigation plan as inferred from route violation notifications. The LIP then tests 1055, whether the iBox has arrived at the destination. If determined that the iBox has indeed arrived at the destination (i.e., "Yes" branch of 1055), the LIP stops any activity related to the iBox. Otherwise (i.e., "No" branch of 1055), the LIP repeats the step 1054.

Figure 11:
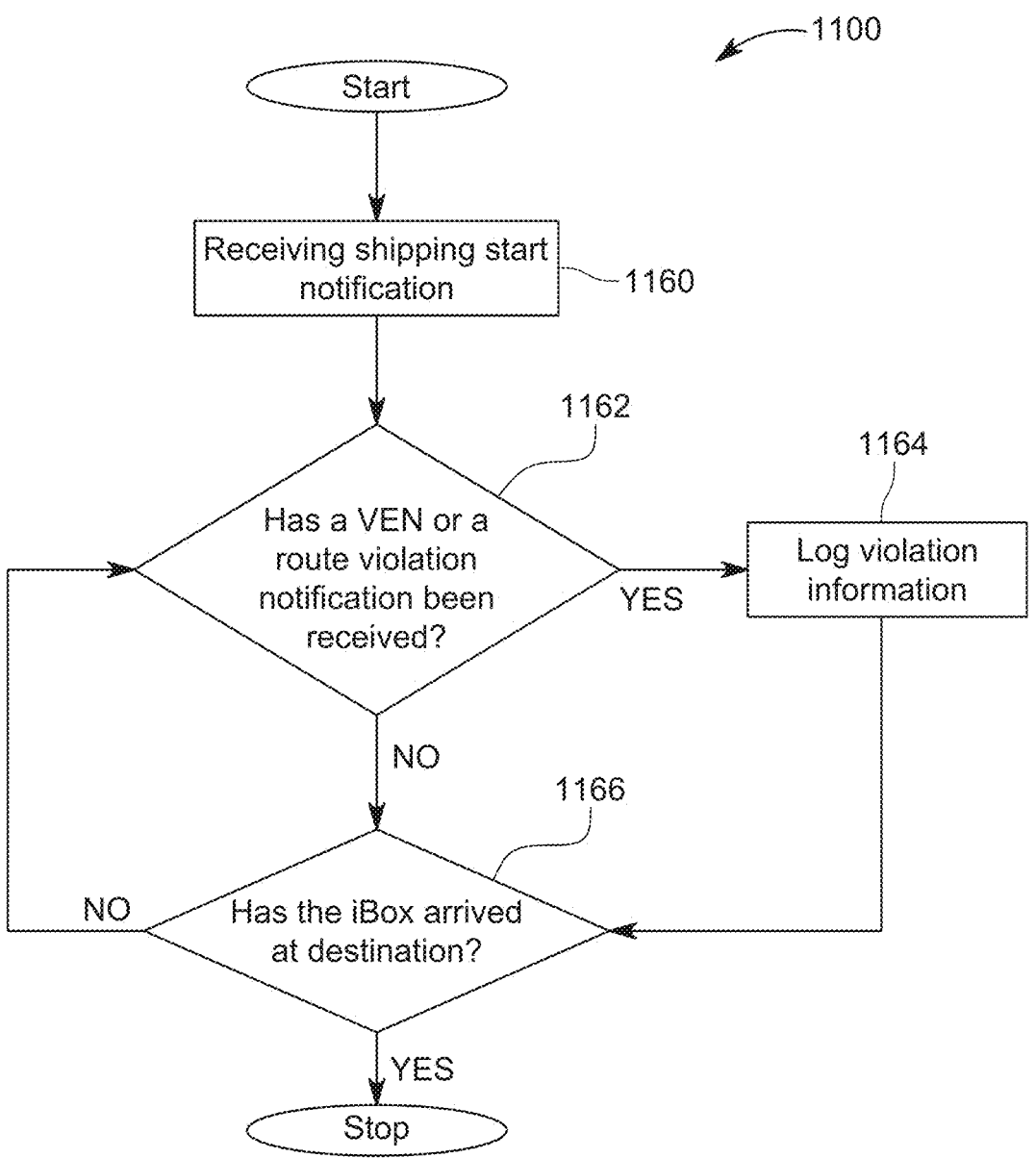
FIG. 11 is a flowchart of a method performed by a logistic customer platform according to an embodiment.

FIG. 11 is a flowchart of a method 1100 performed by an LCP (e.g., 650 in FIG. 6) according to an embodiment. First, the LCP receives 1160 shipment information related to the iBox to be monitored and tracked. The LCP may receive the shipment information from the LIP or the iBox or may receive a notification with the shipment ID and then retrieve further information as needed from a shipping database.

The LCP then monitors 1162 whether a VEN or a route violation notification has been received. When a VEN or a route violation notification has indeed been received (e.g., the "Yes" branch of 1162), the LCP logs violation information (e.g., type of violation, time and/or iBox location, etc.).

The LCP then tests 1166 whether the iBox has arrived at the destination. When the iBox has indeed arrived at the destination (i.e., "Yes" branch of 1166), the LCP stops monitoring related to the iBox. While iBox has not arrived at the destination, the LCP repeats steps 1162-1166.

At times, it may be of interest to track also environmental conditions that the iBox experiences between the shipping point and the destination. For example, an iBox containing medicine or food must not experience temperatures above a first threshold temperature or should not experience temperatures above a second threshold temperature for longer than a predetermined time interval. For these situations, the iBox may include, in addition to the piezoresistive sensor, temperature sensor and/or humidity sensors connected to the electronic unit. The above-described techniques for the pressure/voltage relationship may be reused for temperature and/or humidity monitoring.

Figure 12:
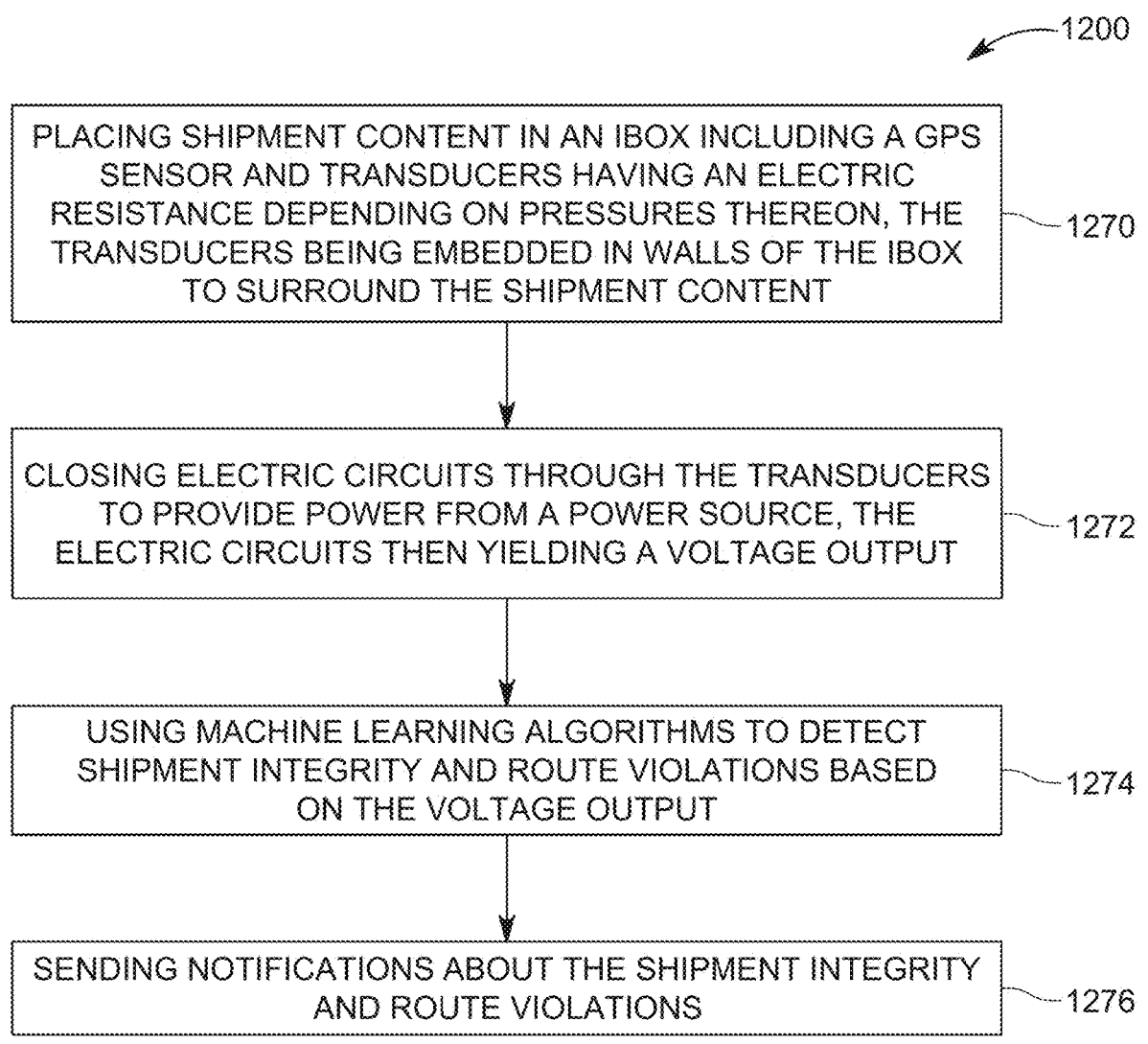
FIG. 12 is a flowchart of a method for shipping and tracking according to an embodiment.

FIG. 12 is a flowchart of a method 1200 for shipping and tracking according to an embodiment. The method 1200 includes placing 1270 a shipment content in an iBox that includes a GPS sensor and transducers having an electric resistance depending on pressures thereon, the transducers being embedded in walls of the iBox to surround the shipment content. The method 1200 further includes closing 1272 electric circuits through the transducers to provide power from a power source, the electric circuits then yielding a voltage output. The method 1200 then includes using 1274 machine learning algorithms to detect shipment integrity and route violations based on the voltage output, and sending 1276 notifications about the shipment integrity and route violations.

The above-described iBoxes, LIP, and LCP improve shipment logistics by providing real-time visibility into the location and status of goods in transit. The goods shipped in iBoxes are surrounded by transducers able to signal additional pressure and are tracked along their route. These operations are performed in a manner mindful of energy consumption. For example, the detection thresholds are established taking into consideration measurements accuracy and other spurious circumstances causing repeated notifications. For example, by establishing that a route violation has occurred when a predetermined percentage p of n>1 GPS locations departed with more than a threshold distance D from the navigation plan, the system takes into consideration the GPS inaccuracy to avoid repeated route violation notifications.

These enhanced methods and system for shipment monitoring and tracking using iBoxes help companies optimize their operations, reduce costs, and improve customer satisfaction by providing accurate delivery estimates. Additionally, the shipment monitoring and tracking enhances security by detecting and preventing theft or tampering of with goods during transit. It can also help companies comply with regulatory requirements by providing a detailed audit trail of the shipment from origin to destination. These shipment monitoring and tracking techniques have the potential to change the way companies manage their supply chains and deliver goods to customers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide methods and systems for shipment monitoring and tracking using intelligent boxes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The entire content of all the publications listed herein is incorporated by reference in this patent application.

[1] U.S. Pat. No. 8,660,814;
[2] CN Patent Application No. 2017/108981978;
[3] U.S. Pat. No. 11,568,353;
[4] U.S. Pat. No. 11,042,829;
[5] *Design and implementation of intelligent tape for monitoring high-price and fragile caro shipments during transport procedures* by W. Chang et al., published in in IEEE Sensors Journal, vol. 20, no. 23, pp. 14521-14533, 1 Dec. 1, 2020, doi: 10.1109/J SEN.2020.3009322; and
[6] *Real-Time Monitoring via Patch-Type Piezoelectric Force Sensors for Internet of Things Based Logistics* by C. Chuang et al., published in IEEE Sensors Journal, vol. 17, no. 8, pp. 2498-2506, 15 Apr. 15, 2017, doi: 10.1109/J SEN.2017.2665653.

What is claimed is:

1. A shipment monitoring and tracking system, comprising:
an intelligent box (iBox) including sensors, a processor using a machine learning algorithm for detecting a shipment integrity and a route violation based on an output from the sensors, and a wireless communication interface configured to send a notification about the shipment integrity and/or the route violation; and
at least one logistic platform configured to wirelessly communicate with the iBox to receive the notification, wherein the sensors include transducers connected through wires to each other to form plural strings, which fully surround an interior of the iBox and yield voltage outputs depending on pressures applied to the transducers,
wherein the processor is configured to detect a breach of a wall of the iBox when the voltage output in one or more strings of the plural strings is less than a first threshold, and
wherein the processor is configured to use the machine learning algorithm to detect an overload event or a dropped event for the iBox, when the voltage output is higher than a second threshold.

2. The shipment monitoring tracking system of claim 1, wherein
the processor invokes a first model of the machine learning model to detect the overload event when the voltage output stays higher than the second threshold for a predetermined time interval, and
the processor invokes a second model of the machine learning model to detect the drop event when the voltage output does not stay higher than the second threshold for the predetermined time interval.

3. The shipment monitoring tracking system of claim 1, wherein the first threshold is less than a difference between a reference voltage output and a measurement accuracy.

4. The shipment monitoring tracking system of claim 1, wherein the transducers are embedded in walls of the iBox.

5. The shipment monitoring tracking system of claim 1, wherein
the sensors include a Global Positioning System (GPS) sensor for detecting locations of the iBox at plural times between a shipping point and a destination of the iBox; and
the processor is configured to detect a route violation based on departures of a sequence of detected locations from a navigation plan.

6. The shipment monitoring tracking system of claim 5, wherein the processor detects the route violation when the sequence including a predetermined percentage of a predetermined number of detected locations have respective distances to a trajectory according to the navigation plan larger than a predetermined distance threshold.

7. The shipment monitoring tracking system of claim 6, wherein the processor receives one or more of the predetermined percentage, the predetermined number, and the predetermined distance threshold from the at least one logistic platform.

8. The shipment monitoring tracking system of claim 1, wherein the at least one logistic platform comprises:
a logistic industry platform (LIP) associated with a shipping point of the iBox, the LIP transmitting shipment information to the iBox; and
a logistic customer platform (LCP) associated with a destination of the iBox, the LCP receiving and logging the notifications.

9. The shipment monitoring tracking system of claim 1, wherein the at least one logistic platform comprises:
a wireless communication interface to receive the notification about the shipment integrity and/or route violation;
a processor and memory configured to log information included in the notifications and times associated with each of the notifications; and
a user interface to enable inputting and visualizing iBox-related information.

10. An intelligent box (iBox) for shipment monitoring and tracking, the iBox comprising:

a data acquisition module configured to gather data that enables assessing shipment integrity and location of the iBox;

a processor using a machine learning algorithm to detect the shipment integrity and/or the route violation based on the data;

a wireless communication interface configured to transmit one or more violation notifications to a logistic platform; and a power source configured to provide power to the data acquisition module, the processor, and the wireless communication interface, wherein the data acquisition module includes transducers connected through wires to each other to form plural strings, which fully surround an interior of the iBox and yield a voltage outputs depending on pressures applied to the transducers, wherein the processor is configured to detect a breach of a wall of the iBox when the voltage output in one or more strings of the plural strings is less than a first threshold, and wherein the processor is configured to use the machine learning algorithm to detect an overload event or a dropped event for the iBox, when the voltage output is higher than a second threshold.

11. The iBox of claim 10, wherein the processor runs in parallel a violation event detector (VED) module configured to detect the shipment integrity violation and a route violation detector (RVD) module configured to detect the route violation.

12. The iBox of claim 11, wherein the processor receives shipment information enabling the VED module to detect the shipment integrity violation, and a navigation plan enabling the RVD module to detect the route violation.

13. The iBox of claim 10, wherein the processor invokes a first model of the machine learning model to detect the overload event when the voltage output stays higher than the second threshold for a predetermined time interval, and the processor invokes a second model of the machine learning model to detect the drop event when the voltage output does not stay higher than the second threshold for the predetermined time interval.

14. The iBox of claim 10, wherein the data acquisition module includes a Global Positioning System (GPS) sensor for detecting locations of the iBox at plural times between a shipping point and a destination of the iBox; and the processor is configured to detect a route violation based on departures of a sequence of detected locations from a navigation plan.

15. The iBox of claim 14, wherein the processor detects the route violation when the sequence includes a predetermined percentage of a predetermined number of detected locations have respective distances to a trajectory according to a navigation plan, larger than a predetermined distance threshold.

16. The iBox of claim 15, wherein the processor receives one or more of the predetermined percentage, the predetermined number, and the predetermined distance threshold from a logistic industry platform.

17. The iBox of claim 10, wherein the power source comprises a rechargeable battery and a power harvesting device.

18. A method for monitoring and tracking a shipment, comprising:

placing a shipment content in an intelligent box (iBox) including a Global Positioning System (GPS) sensor and transducers having an electric resistance depending on pressures thereon, the transducers being connected with wires to each other to form plural strings, which are embedded in walls of the iBox to fully surround an interior of the iBox;

closing electric circuits formed by the plural strings through a set of pins located on a flap of the iBox and a set of holes located on a wall of the iBox, to provide power from a power source, the electric circuits then yielding a voltage output;

using a machine learning algorithm at a processor of the iBox, to detect a shipment integrity and a route violation based on the measured voltage output; and sending a notification about the shipment integrity and/or a route violation to a remote server, wherein the plural strings fully surround an interior of the iBox and yield a voltage outputs depending on pressures applied to the transducers, wherein the processor is configured to detect a breach of a wall of the iBox when the voltage output in one or more strings of the plural strings is less than a first threshold, and wherein the processor is configured to use the machine learning algorithm to detect an overload event or a dropped event for the iBox, when the voltage output is higher than a second threshold.

* * * * *